United States Patent
Meulendijks et al.

(10) Patent No.: US 6,214,457 B1
(45) Date of Patent: Apr. 10, 2001

(54) DISPLAY WINDOW HAVING REDUCED GLARE

(75) Inventors: Gijsbertus H.W.M. Meulendijks; Sebastianus N.G. Cuppen; Hendrikus L. Vandijck; Johannes M.A.A. Compen, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/162,819

(22) Filed: Sep. 29, 1998

Related U.S. Application Data

(62) Division of application No. 08/576,542, filed on Dec. 21, 1995, now Pat. No. 5,869,128.

(30) Foreign Application Priority Data

Dec. 23, 1994 (EP) .................................. 94203752

(51) Int. Cl.$^7$ ........................................ B32B 5/16
(52) U.S. Cl. .................... 428/323; 428/328; 428/329; 428/331; 359/599; 359/601
(58) Field of Search .................... 428/323, 324, 428/325, 328, 329, 330, 331; 359/601, 609, 599

(56) References Cited

U.S. PATENT DOCUMENTS

| | | | | |
|---|---|---|---|---|
| 5,296,974 | * | 3/1994 | Tada et al. | 359/885 |
| 5,307,438 | * | 4/1994 | Bilkadi et al. | 385/141 |
| 5,612,128 | * | 3/1997 | Endo et al. | 428/323 |

\* cited by examiner

Primary Examiner—Paul Thibodeau
Assistant Examiner—Holly C. Rickman
(74) Attorney, Agent, or Firm—F. Brice Faller

(57) ABSTRACT

Method for manufacturing a glass substrate with reduced glare wherein a suspension comprising sub-micron transparent oxide particles and a binder is coated on the substrate to form a film, whereafter the film is dried in such manner that in situ flocculation of the particles takes place. Said in-situ flocculation strongly reduces glare on the said surface.

4 Claims, 4 Drawing Sheets

DISPLAY WINDOW HAVING REDUCED GLARE

CROSS REFERENCE TO RELATED APPLICATIONS

This is a divisional of application Ser. No. 08/576,542 filed Dec. 21, 1995 now U.S. Pat. No. 5,869,128.

BACKGROUND OF THE INVENTION

A substrate with reduced glare, method for manufacturing a display window of a cathode ray tube and to a cathode ray tube having a display window.

Such methods are for instance used to reduce the glare of a display window of a display device such as a cathode ray tube or an LCD device.

The invention also relates to a method for manufacturing a display window of display device and to a display device having a display window with reduced glare.

Reflections on a substrate are often considered bothersome, especially when they occur on a surface of a display window of a display device, since such reflection reduce the contrast, clarity and/or colour reproduction of the displayed image. There are two ways in which the reflection on a surface can be suppressed; by randomly diffusing the reflected image (anti-glare, AG) or by preventing distinct optical interfaces (anti-reflex, AR). To reduce the glare several methods are known such as etching, wet-blasting and spraying of silica-like materials. These methods each have their short-comings. Etching requires the use of a strong etching fluid, which represent an environmental as well as a safety hazard and relatively expensive. Wet-blasting, which is a method in which hard particles suspended in a fluid are blasted against the surface to thereby change the surface structure of said surface, is a relatively expensive and time-consuming method and requires safety measures. Spraying of silica-like materials is a method which is time-consuming and in which relatively easily loose particles are generated and for which it is very difficult to achieve a even distribution of the silica particles over the surface and thus a evenly distributed reduction of the diffuse reflection.

SUMMARY OF THE INVENTION

The present invention has as its objective to provide a display device having a display window with a surface with reduced diffuse reflection.

To this end, according to the invention, a suspension comprising sub-micron transparent oxide particles and a binder is coated on the substrate e.g. on a surface of the display window to form a film, whereafter the film is dried in such manner that in situ flocculation of the particles takes place.

A display device according to the invention is characterized in that a coated film is provided on a surface of the display window which film comprises flocculated sub-micron transparent oxide particles.

Flocculation is a process wherein several particles flocculate (agglomerate) to form irregularly shaped larger flocs. Said flocs, preferably having an average size of approximately 1–5 $\mu$m, affect, namely strongly reduce, the diffuse reflection of visible light on said surface.

Flocculation of a suspension is normally considered a process which is to be prevented. Flocculation usually reduces the life-time of a suspension, the process itself, if it occurs, is very difficult to control, flocculation may notably prevent effective filtering of the suspension (because dust particles have approximately a size of 1–5 $\mu$m) and may lead to clogging up of suspension conduit pipes, spraying nozzles etc and reduces the homogenity of the applied layer leading to striations, patchiness etc of the dried layer.

The inventors have, however, realized that a film comprising flocculated sub-micron particles suppress diffuse reflection in a broad wavelength range, due to the fact that the size of the flocs is more or less randomly distributed in size. Therefor a very uniform suppression of diffuse reflection occurs. Furthermore it is realized that in situ, i.e. "on the surface of the substrate", flocculation of the sub-micron particles is possible. By applying the suspension on the surface, and thereafter effecting flocculation of the sub-micron particles, distribution of the flocs is achieved which is on a centimeter scale evenly distributed, yet is, on a micron scale, truly random.

The layer could be applied by means of for instance flow-coating or spraying or other methods. Preferably, however, the film is applied by means of spin-coating. Spin coating allows in a simple manner to achieve a uniform thickness of the suspension over the surface. This increases the uniformity (on a large scale) of the distribution of the flocs over the display window.

Preferably the size of the sub-micron particles is between approximately 350 and 30 nm. In this size range the effect of each singular particle on the reflected light is small. Preferably the size of the particle is smaller than 200 nm. The effect of each particle on the light is then negligible.

The transparent oxide particles could consist of $TiO_2$, $SiO_2$, $Al_2O_3$ etc.

Preferably the suspension is a colloidal suspension of the particles in water. Such suspensions do not require special health or environmental safety measures.

BRIEF DESCRIPTION OF THE DRAWINGS

The drawings are diagrammatic and not drawn to scale. In general, equal parts bear the same reference numerals.

DETAILED OF THE PREFERRED EMBODIMENTS

Figure 1:
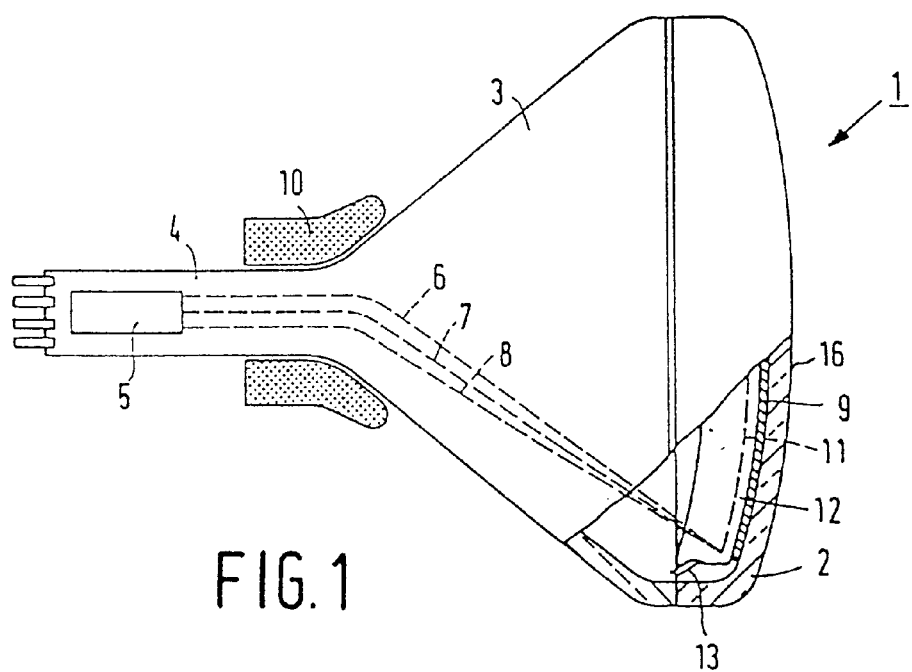
FIG. 1 shows in a sectional view a cathode ray tube.

FIG. 1 is a sectional view of a cathode ray tube, in this example a colour cathode ray tube, having an evacuated envelope 1 which comprises a substantially regular display window 2, an enveloping portion 3 and a neck 4. In the neck there is provided an electron gun system 5 for generating, in this case, three electron beams 6, 7 and 8. In this example, the electron guns are generated in one plane (the plane of drawing) and are directed to an electroluminescent display screen 9 which is provided on the inside of the display window and which comprises a phosphor pattern consisting of a large number of phosphor elements luminescing in red, green and blue. The phosphor elements may be in the form of, for example, dots or lines. On their way to the display screen 9, the electron beams 6, 7 and 8 are deflected across the display screen 9 by means of a deflection unit 10 and pass through a colour selection electrode 11 which is arranged in front of the display screen 9 and which comprises a thin plate with apertures 12. The three electron beams 6, 7 and 8 pass through the apertures 12 of the colour selection electrode 11 at a small angle and, consequently, each electron beam impinges on phosphor elements of only one colour. The colour selection electrode 11 is suspended in front of the display screen by means of suspension means 13.

A surface of the display window, in this example the inner surface 16 is provided with a film to reduce the diffuse reflection on said surface.

Figure 2A:
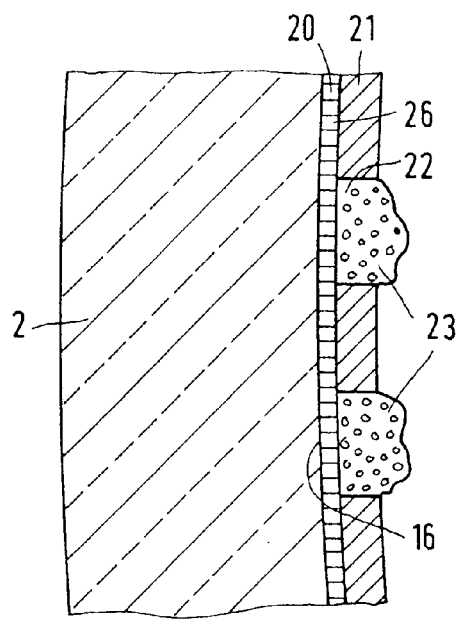
FIGS. 2A and 2B show in cross section a display window having a glare reducing film.
Figure 2B:
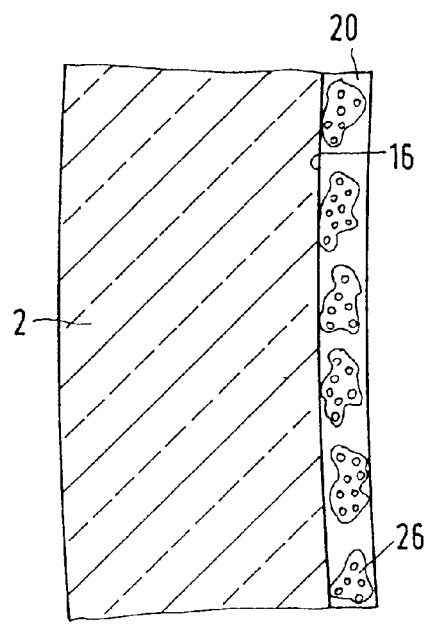

FIGS. 2A and 2B show in cross section a display window as shown in FIG. 1.

FIG. 2A shows display window 2 being on its inner surface 16 coated with a film 20. On top of the film 20 there is provided a black matrix 21 having apertures 22 in which phosphor elements 23 are provided. FIG. 2B is similar to FIG. 2A except that only the film 20 is shown. Film 20 comprises a large number of flocs 26.

Figure 3A:
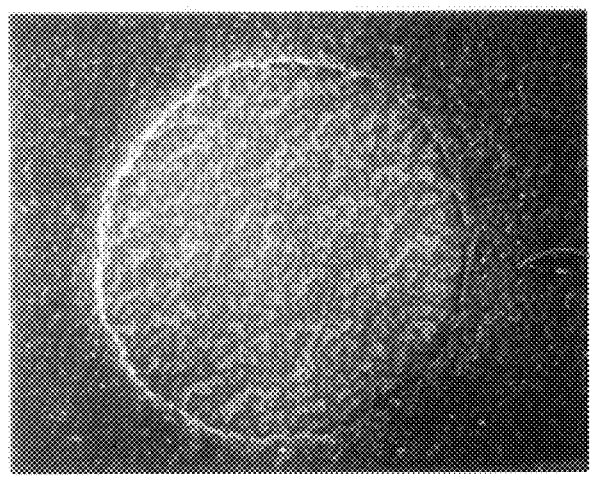
FIGS. 3A to 4C show films having flocculated sub-micron particles.
Figure 3B:
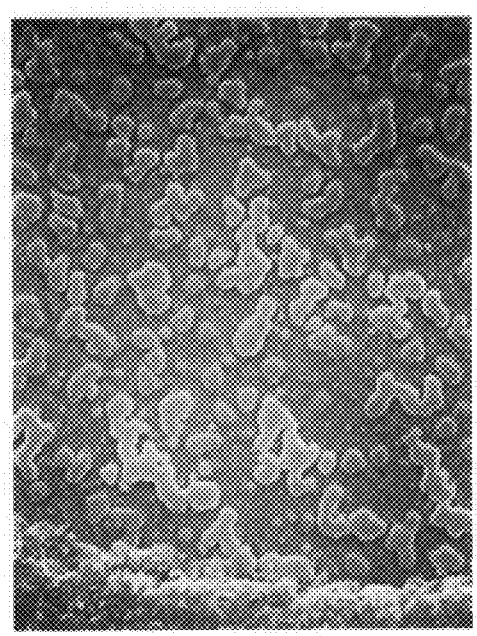
Figure 3C:
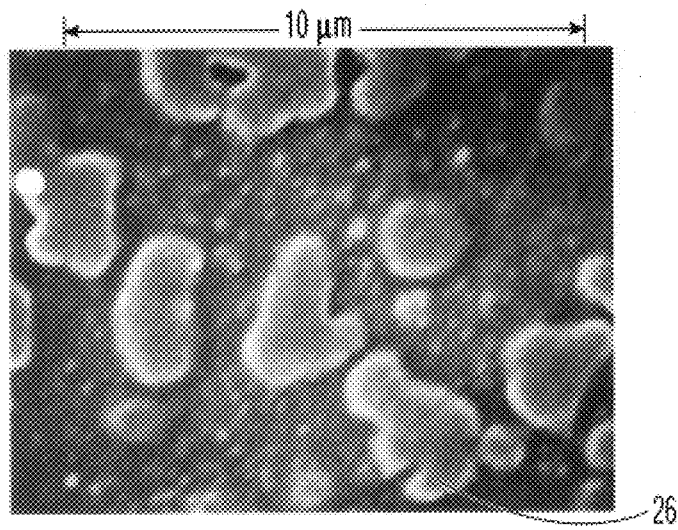

FIGS. 3A to 3C show in top view an aperture 31 in black matrix 21 (FIG. 3A) and enlargements of the film 20. Clearly is seen that flocs 26 are present. In this example, the size of the flocs is in the range of approximately 1 to 5 $\mu$m, which is the preferred range. The size of the sub-micron particles in this example is approximately 125 nm. Some single particles are visible in FIG. 3C. The "average size of the particles" is to be understood the so-called $d_{50}$.

Preferably the size of the sub-micron particles is between approximately 350 and 30 nm. In this size range the effect of each singular particle on the reflected light is small. Preferably the size of the particle is smaller than 200 nm. The effect of each particle on the light is then negligible.

Figure 4A:
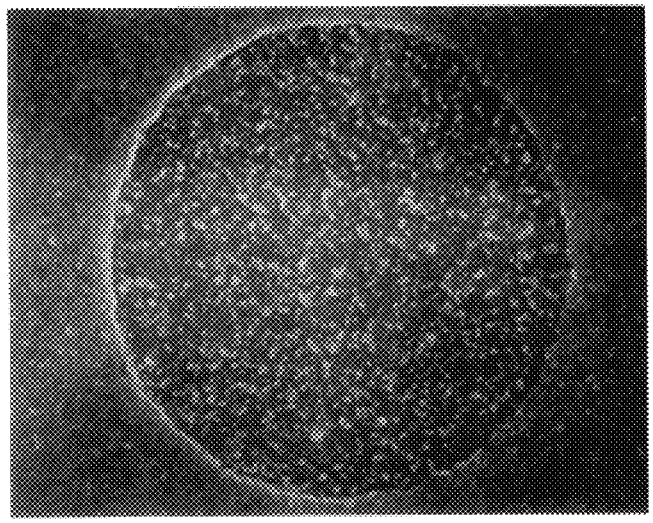
Figure 4B:
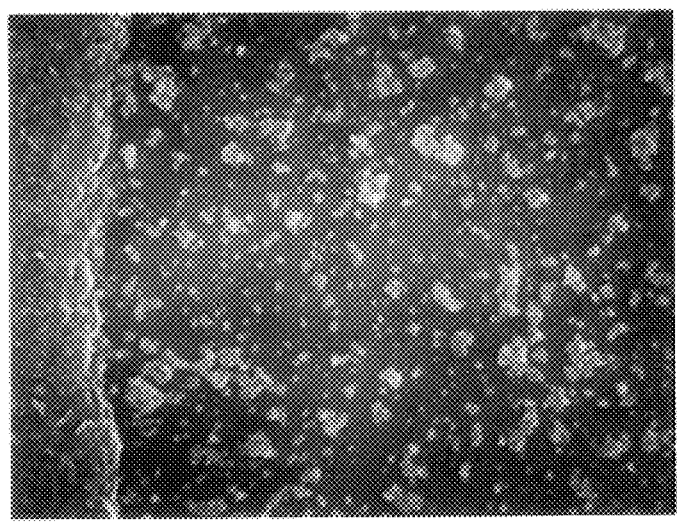
Figure 4C:
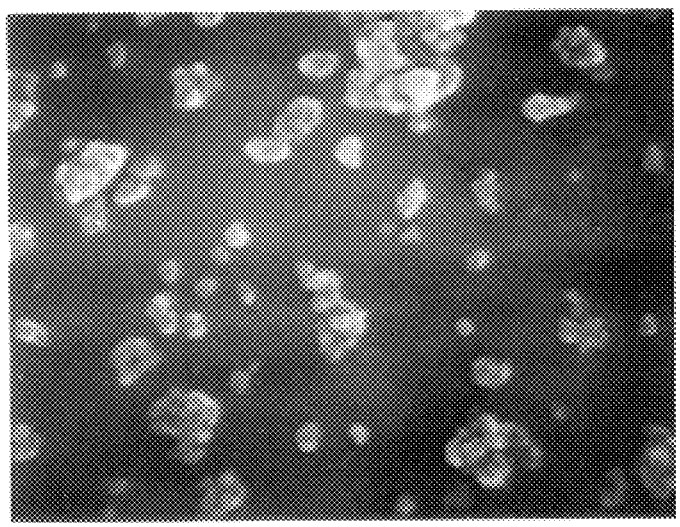

FIGS. 4A to 4C show a film 41 having flocs of particles having an average size of approximately 300 nm. The suppression of the diffuse reflection of such a film is appreciable, but less than the film shown in FIG. 3.

The particles are made of transparent oxide particles, in the example shown the sub-micron particles are made of $SiO_2$ and $TiO_2$ for FIGS. 3 and 4 respectively.

Figure 5:
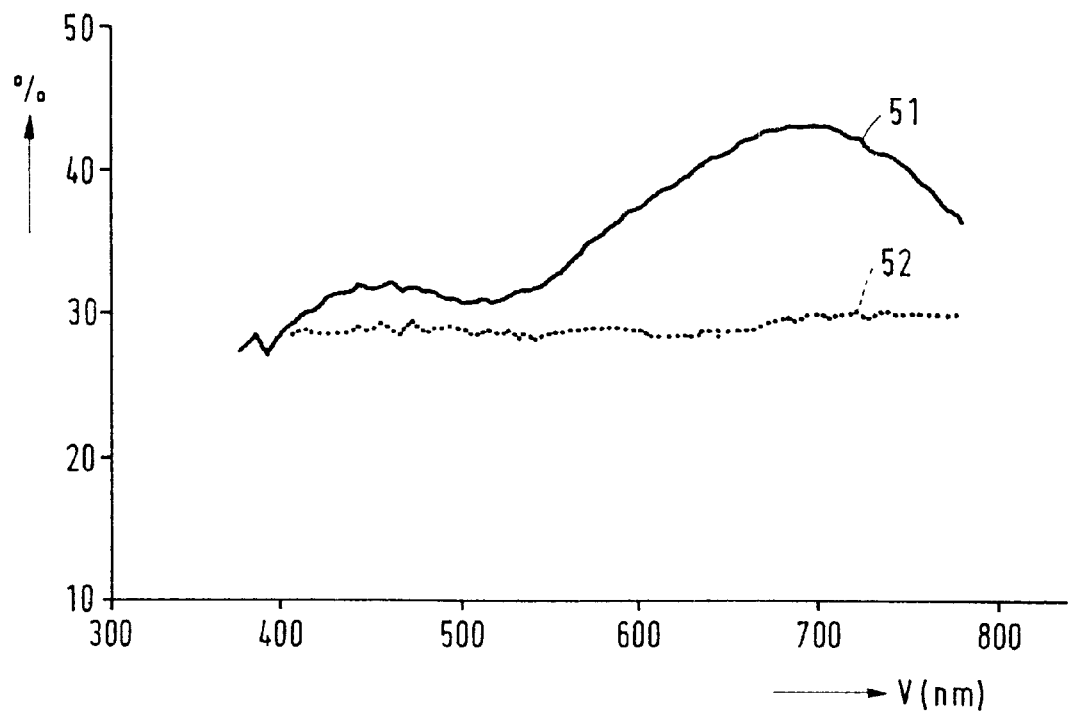
FIG. 5 shows in graphical form the reduction of diffuse reflection by means of a film as shown in FIGS. 3A to 3C.

FIG. 5 shows as a function of wavelength $\lambda$ (in nm) the suppression of the diffuse reflection. The horizontal axis denotes the wavelength of the light incident of the inner surface of the display window, the vertical axis denotes the amount of diffuse reflection on said surface compared to an untreated surface in %. Line 51 in FIG. 5 shows that a film as shown in FIGS. 3A to 3C reduces the diffuse reflection to 30–40% of the value for the inner surface without the film. Line 52 shows by comparison the effect of a so-called inside etch. The reductions in the diffuse reflection are comparable.

Figure 6:
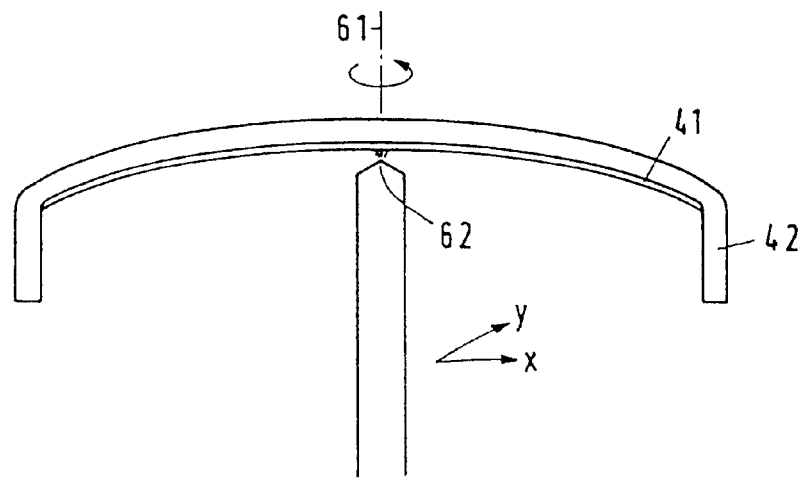
FIG. 6 illustrates a method for coating the inner surface of a display window of a cathode ray tube.

FIG. 6 illustrates an embodiment of the method according to the invention. Display window are cleaned using standard procedures (e.g. by means of a solution of HF followed by a water rinse using demineralized water). Display window 2 is rotated (spun) around rotation axis 61. Via nozzle 62 a colloidal suspension of sub-micron particles is applied to the surface. Due to the spinning of display window the suspension spreads out over the surface to form a film with an evenly distributed thickness. The spun-on film is dried using infra-red drying. After an initial drying period (e.g. approximately 20 seconds) air blowing is additionally applied for complete drying and to floc the sub-micron particles. A forced-drying method step, in this example by means of air blowing, results in the formation of flocs. When a standard drying method is used flocculation does not occur. The start of the air blowing and the air flow regulates the amount of agglomeration (and thus the size of the flocs). The flocs are responsible for the effective suppression of the diffuse reflection. The flocs are randomly formed and therefore the diffuse reflection is suppressed in abroad wavelength range.

The reason for the difference in layer morphology between conventional drying methods and methods in which (air-)forced drying is applied might be the following. In colloidal suspension the particles are charged which prevents agglomeration of the particles into flocs. During conventional drying attractive capillary forces between the sub-micron particles which tend to cause agglomeration of the particles into flocs is balanced by the repelling forces between the charged particles. During forced drying, however, the capillary forces are probably enhanced to be stronger than the repelling forces, leading to agglomeration of the sub-micron particles into flocs. Preferably the forced-drying period is preceded by a conventional drying period in which no flocculation occurs. Such a preceding period allows the coating to form a smooth layer on the surface. Too soon a flocculation of the suspension could interfere with a proper distribution of the flocs over the surface. In this example the suspension is spin-coated over the surface. This is preferred embodiment of the method, especially if the inside surface of a cathode ray tube is supplied with a coating. However, other means of coating could be applied for instance brushing of the suspension over the surface, or using a knife-edge method to apply a layer of suspension. The latter method, in which a layer of a liquid is spread out over a surface by means of a knife-edge, can for instance be used if a flat surface is coated.

Preferably a watery colloidal suspension is used. Watery suspension, i.e. suspension on water basis do not pose a health or environmental hazard. An example of a useful colloidal suspension is a watery colloidal suspension of silica particles of an average radius of 125 nm, for instance the suspension Syton-HT50 from Dupont to which a Lithium polysilicate (LipolySi, Dupont type poly-48) is added as a binder and an adhesive, and PVA (40–88) as an adhesive, film promoter and binder. The basic suspension composition was 3% (by weight) Syton, PVA: 0.4% and LipolySi 0.4%. Relatively wide variations around these values are possible (1–5% Syton), 0.2–1.5% PVA; 0.05–1.5% LipolySi.

The anti-glare layer can be provided on any surface. The above example relate to cathode ray tubes. Other display devices might also be provided with such anti-glare layers on display windows. Example of such other display devices are for instance LCD and plasma display devices.

The reflection reducing layer in accordance with the invention can advantageously be used in display devices in which a so-called matrix is applied. A matrix is a black layer surrounding the colour elements to increase the sharpness and/or contrast of the image. Devices in which a matrix are applied are for instance CRTs, LCD and plasma display devices. The adherence of the matrix to the layer comprising flocculated micro-particles has been found to be satisfactory. Said matrix is preferably applied over said layer.

It will be clear to a person skilled in the art that the invention is not restricted to the above given examples but that within the framework of the invention further embodiments are possible.

For instance other materials can be used for the transparent oxide particles, such as $Al_2O_3$ (Alumina) or Zirconia.

What is claimed is:

1. A display device comprising a display window having a surface which is coated with a film, the film comprising flocs of flocculated sub-micron transparent particles in a binder, said flocs having an average size in the range of approximately 1–5 μm, said flocs having irregular shapes and being randomly distributed in size.

2. A display device as in claim 1 wherein the surface is the inner surface of a cathode ray tube.

3. A display device as in claim 1 wherein the average size of the sub-micron particles is between 30 nm and approximately 350 nm.

4. A display device as in claim 3 wherein the size of the particles is less than 200 nm.

* * * * *